United States Patent
Pimminger et al.

(10) Patent No.: US 12,149,118 B2
(45) Date of Patent: Nov. 19, 2024

(54) CONTROL ARRANGEMENT, BACKUP SYSTEM AND METHOD FOR CONTROLLING AN INVERTER

(71) Applicant: Fronius International GmbH, Pettenbach (AT)

(72) Inventors: Hans-Peter Pimminger, Pettenbach (AT); Martin Heidl, Pettenbach (AT); Florian Guschlbauer, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 24 days.

(21) Appl. No.: 18/005,646

(22) PCT Filed: Sep. 27, 2021

(86) PCT No.: PCT/EP2021/076525
§ 371 (c)(1),
(2) Date: Jan. 16, 2023

(87) PCT Pub. No.: WO2022/064044
PCT Pub. Date: Mar. 31, 2022

(65) Prior Publication Data
US 2023/0291227 A1 Sep. 14, 2023

(30) Foreign Application Priority Data
Sep. 28, 2020 (EP) ..................... 20198669

(51) Int. Cl.
*H02J 9/06* (2006.01)
*H02J 3/32* (2006.01)
(Continued)

(52) U.S. Cl.
CPC ............... *H02J 9/062* (2013.01); *H02J 3/32* (2013.01); *H02J 3/381* (2013.01); *H02M 1/36* (2013.01);
(Continued)

(58) Field of Classification Search
CPC .... H02J 9/062; H02J 3/32; H02J 3/381; H02J 2203/10; H02J 2300/24; H02J 7/35;
(Continued)

(56) References Cited

U.S. PATENT DOCUMENTS 9,397,504 B1 * 7/2016 Narla .................... H02S 40/38
2012/0057383 A1 3/2012 Wei et al.
(Continued)

FOREIGN PATENT DOCUMENTS

| CN | 106655255 A | 5/2017 |
| JP | H7-336898 A | 12/1995 |
| WO | 2017/106670 A1 | 6/2017 |

OTHER PUBLICATIONS

International Search Report corresponding to PCT Application No. PCT/EP2021/076525, mailed Nov. 3, 2021 (English language document) (4 pages).

*Primary Examiner* — Lincoln D Donovan
*Assistant Examiner* — Alex W Lam
(74) *Attorney, Agent, or Firm* — Maginot, Moore & Beck, LLP

(57) ABSTRACT

A secure, reliable and simplified control mechanism for operating an inverter is provided. In particular, a mechanical switch is used for connecting a local grid with a public grid and for disconnecting the local grid from the public grid. The mechanical switch comprises an intermediate position. Each time when the switch is in this intermediate position, the inverter is immediately shut down in a fast shutdown operation.

13 Claims, 2 Drawing Sheets

(51) Int. Cl.
*H02J 3/38* (2006.01)
*H02M 1/36* (2007.01)
(52) U.S. Cl.
CPC ....... *H02J 2203/10* (2020.01); *H02J 2300/24* (2020.01)
(58) Field of Classification Search
CPC .............. H02J 2300/20; H02J 2310/10; H02J 2310/12; H02J 3/388; H02M 1/36; H01H 3/52; H01H 19/46; Y02E 10/56
See application file for complete search history.

(56) References Cited

U.S. PATENT DOCUMENTS

| | | |
|---|---|---|
| 2017/0229868 A1 | 8/2017 | Laval et al. |
| 2018/0131226 A1 | 5/2018 | Narla et al. |

\* cited by examiner

CONTROL ARRANGEMENT, BACKUP SYSTEM AND METHOD FOR CONTROLLING AN INVERTER

TECHNICAL FIELD

The present invention relates to a control arrangement for an inverter and a method for controlling an inverter. The present invention further relates to an electrical power backup system.

BACKGROUND

Even though applicable in general to any kind of electrical power backup system, the present invention and its underlying problem will be hereinafter described in conjunction with a local power network, for example a power network of a household, which is connected to a public grid.

Decentralized renewable energy sources are becoming increasingly important. For example, individual photovoltaic units are installed on more and more houses. Furthermore, such installations may comprise a local storage unit, such as a battery, for temporarily storing electrical energy.

The installations may be further connected to a public energy grid. In this way, surplus energy of the local energy source may be provided to the public grid. Additionally or alternatively, it may be also possible to obtain additional electrical energy from the public grid in case that the local system is not in the position to provide the total local energy requirement.

However, for such installations numerous national regulations have to be considered and fulfilled. For example, in case of a failure or maintenance in the public grid, it must be ensured that the public grid is securely disconnected from the local energy sources in order to avoid energy injection into the public grid during maintenance of the public grid. For this purpose, a local power generator in a household has to be also shut down or securely disconnected from the public grid in case of a failure or shutdown of the public grid. For this purpose, usually complex and expensive arrangements are used in order to consider and fulfill the respective national requirements.

Against this background, the present invention aims to provide a secure, reliable and simplified arrangement for controlling operation of a local power source such as an inverter, which may be connected to a public grid.

SUMMARY OF THE INVENTION

The present invention provides a control arrangement for an inverter, an electrical power backup system and a method for controlling an inverter with the features of the independent claims. Further advantageous embodiments are subject-matter of the dependent claims.

According to a first aspect, a control arrangement for an inverter is provided. The control arrangement comprises a switch and a control device. The switch may comprise at least three switching positions. The at least three switching positions comprise a first position, a second position and an intermediate position. The switch is configured such that the switch is set to the intermediate position before each change between the first position and the second position. The control device is configured to shut down the inverter as soon as (i.e. immediately upon) the switch is set to the intermediate position. The control device is further configured to operate the inverter in an on-grid mode when the switch is set to the first position, and to operate the inverter in an off-grid mode when the switch is set to the second position.

According to a further aspect, an electrical power backup system is provided. The electrical power backup system comprises an inverter which is configured to provide an alternating current power supply. The electrical power backup system further comprises a control arrangement according to the first aspect. In particular, the switch of the control arrangement may be configured to connect a public grid and a local grid if the switch is in the first position. Further, the switch may be configured to disconnect the public grid from the local grid if the switch is in the second position or in the intermediate position.

According to still a further aspect, a method for controlling an inverter is provided. The method comprises detecting an intermediate position of a switch, wherein the switch provides at least three switching positions, and the three switching positions comprise at least a first position, a second position and an intermediate position and the switch is configured such that the switch is set to the intermediate position before each change between the first and the second position. The method further comprises a step of shutting down the inverter upon detecting that the switch is set to the intermediate position. Further, the method may comprise a step of operating the inverter in an on-grid mode when the switch is set to the first switching position, and a step of operating the inverter in an off-grid mode when the switch is set to the second position.

The present invention is based on the finding that it is essential and mandatory to consider local regulations and security requirements when operating a local power generator which is connectable to a public grid. However, conventional solutions considering all these regulations and security constraints usually are very complex and expensive.

The present invention therefore takes into account this finding and aims to provide a secure, reliable and simple arrangement for controlling local power generation and connection of a local power generator to a public grid.

The present invention proposes to use a mechanical switch, in particular a manually operated mechanical switch, which is used for connecting or disconnecting the local energy generator and the public grid. In this connection, it is a particular idea of the present invention to use a mechanical switch, which provides an additional intermediate position. The intermediate position is a further switch position in addition to the switch position in which the local power generator is connected to the public grid and the switch position in which the local power generator is disconnected from the public grid. In this intermediate position, which is always set during each transition between a first position, in which the local power generator is connected to the public grid, and the second position, in which the local power generator is disconnected from the public grid, it is possible to operate the system such that a secure operation of the local power generator, for example, a local inverter for providing alternating current power can be achieved.

To achieve a secure transition between an on-grid mode, in which the local power generator is connected to the public grid and an off-grid mode, in which the local power generator is disconnected from the public grid, the control arrangement according to the present invention initiates a fast shutdown of the local power generator, in particular an inverter of the local power generator, upon detecting the intermediate position, which indicates a transition from an on-grid mode in the first position to an off-grid mode in the second position, or a transition from the second position of the off-grid mode to the first position of the on-grid mode.

For example, the fast shutdown mode is initiated by a user when the user sets the switch to the intermediate position. During the fast shutdown mode, the inverter shuts down within a first predefined time period. The first predefined time period is defined based on, for example, regulations specific to a region or country. The first predefined time period is, for example, 50 milliseconds.

By initiating a fast shutdown mode of the local power generator, in particular, the inverter, it can be ensured that the local power generator is shut down when changing between the on-grid mode and the off-grid mode. In particular, the shutdown of the local power generator, in particular, the inverter, upon setting the switch to the intermediate position is performed in the fast shutdown mode. In the fast shutdown mode, the inverter may be shutdown within the predefined time period of only a few milliseconds, e. g. within 50 milliseconds.

Accordingly, it can be ensured that the local power generator may stop almost immediately. Thus, it can be ensured that the inverter does not provide electrical power during the transition between the on-grid mode and the off-grid mode. In this way, transmission of locally generated power into the public grid can be prevented. Furthermore, it can be prevented that the local grid and the public grid are electrically coupled with each other in case that the local power generation by the inverter is not synchronized with the public grid.

Moreover, due to the fast shutdown mode of the inverter when changing in between the first position and the second position, it can be ensured that the local power generator, in particular, the inverter, is stopped and shut down. Thus the inverter does not provide any electrical power to the local grid comprising loads such as household appliances, etc., when operating the switch between the on-grid mode and the off-grid. This ensures the safety of the local grid and prevents failure of the local grid.

Moreover, after the switch has been operated in order to select the desired on-grid mode or off-grid mode from the intermediate position, the system may be checked for a plurality of predetermined requirements by a measurement device and/or a control device. After it has been verified that the predetermined requirements for restarting the system in the selected operating mode are fulfilled, the inverter may be restarted.

In particular, the inverter may be restarted in the on-grid mode based on a plurality of first predetermined requirements. And, the inverter may be restarted in the off-grid mode based on a plurality of second predetermined requirements. In an example, the inverter may be restarted in synchronization with the public grid in the on-grid mode when the first predetermined requirements are satisfied. In an embodiment, the measurement device and/or the control device of the inverter verifies whether the first predetermined requirements are satisfied.

In another example, the inverter may be only restarted in the off-grid mode after thoroughly verifying that the local grid is securely disconnected from the public grid by the control device of the inverter. Here, one of the second predetermined requirements is to verify whether the local grid is securely disconnected from the public grid. In an embodiment, the measurement device and/or the control device of the inverter verifies whether the second predetermined requirements are satisfied.

After the local power generator, in particular, the inverter has been shut down by the fast shutdown mode as soon as (i.e. immediately upon) the switch has been set to the intermediate position, it may be desirable for the switch to remain in this intermediate position for a predefined waiting time, for example, five seconds. When the switch remains in the intermediate position for the predefined waiting time, the loads in a load network are protected from any potential damage which maybe caused due to a phase shift change or a frequency shift.

Thus, the inverter may restart in normally when the switch is further moved either to the first position for operation in on-grid mode or to the second position for operating the inverter in the off-grid mode.

As already mentioned above, the electrical power backup system may completely verify whether the predetermined requirements for restarting the inverter are fulfilled. For example, the system may verify whether the electrical conditions of the public grid are in line with the first predetermined requirements before operating the system in the on-grid mode. Alternatively, the system may verify whether the local network is securely disconnected from the public grid before operating the system in the off-grid mode. However, it is understood that any further specifications or requirements may be also verified before restarting the system in the desired mode.

The switch may be any kind of appropriate switch providing the required switching capabilities. For example, the switch may provide an appropriate number of main switching elements for connecting/disconnecting the power lines (L1, L2, L3) of the public grid with the respective lines of the local grid. Depending on the local regulations, the switch may also provide the switching element for connecting/disconnecting the neutral line (N). As will be described in more detail below, the switch may further provide a number of one or more auxiliary switching elements, which may be switched together with the main switch elements.

The switch may be, for example, a switch which may be operated manually by a user. For example, the switch may comprise a rotary knob for setting the switch in the desired position. However, it is understood, that any other appropriate switch, in particular any other type of manually operable switch may be possible, too.

The operation of the local power source, in particular, the operation of a power generator such as an inverter or the like may be controlled, for example, by any kind of appropriate control device. For example, the control device may comprise a processing unit with at least one processor and a related memory for storing instructions and parameters for controlling the related devices. The processor may be communicatively coupled with the memory, for example by a memory bus or the like. Accordingly, the processor may read the instructions and/or the parameters in order to perform the desired control operations. For this purpose, the processor may further execute, for example, an operating system. The control device may further comprise a number of terminals for receiving external signals, for example signals indicating a position of the switch or for receiving any other kind of signal. For example, the control device may further receive signals from a measurement device for measuring electrical parameters of the local grid, the public grid and/or electrical power flowing to/from the public grid. Furthermore, the control device may comprise also further interfaces for receiving control instructions from a user or a remote computer or the like.

Further embodiments of the present invention are subject of the further sub-claims and of the following description referring to the drawings.

In a possible embodiment, the inverter is shut down within a first predefined time period, in particular, a time interval of maximum 50 milliseconds after the switch is set to the intermediate position. The fast shutdown mode of the inverter may be controlled, for example, by the control device. By shutting down the inverter in such a short period of time, it can be ensured that the system is shut down to avoid dangerous situations such as unwanted power transition from the local grid to the public grid or an electrical connection between the public grid and a local grid, which is not synchronized with the public grid. In particular, the fast shutdown mode of the inverter upon detecting that the switch is in the intermediate position allows not only to prevent dangerous situations, but also to fulfill all requirements of the respective national regulations. In particular, due to the feature of such a fast shutdown mode of the inverter, it is possible to use a manually operated switch for switching between the on-grid mode and the off-grid mode without the need of any additional complex and expensive hardware components.

In a possible embodiment, the switch may be configured to connect the public grid and the local grid in a first position. The switch may be further configured to disconnect the public grid from the local grid in the second position. For this purpose, the switch may comprise a number of appropriate switching elements for connecting/disconnecting the respective power lines between the public grid and the local grid. Depending on the national or regional regulations, the switch may comprise not only switching elements for the main power lines L1, L2 and/or L3, but also for the neutral line N. It is understood, that the respective switching elements of the switch may be appropriate for switching the respective power level, in particular the respective voltage and current in the respective lines.

In a possible embodiment, the control device may comprise a monitoring circuit. The monitoring circuit may be configured to monitor a current state of the switch. Accordingly, the control device may operate the inverter in the off-grid mode only if the local grid is disconnected from the public grid. For example, the monitoring circuit may be connected to terminals of one or more switching elements of the switch, which are closed when the switch is in a position for disconnecting the public grid from the local grid. Additionally or alternatively, the switch may comprise an auxiliary switching element, which is switched in synchronization with the main switching elements for switching the power lines. Accordingly, the monitoring switch may monitor the state of such an auxiliary switch.

In a possible embodiment, the switch may comprise a first auxiliary switching element. The first auxiliary switching element is in an open position the switch is in the intermediate position. The first auxiliary switching element is in the closed position when the switch is in the first position or the second position. Accordingly, the control device may be configured to immediately shut down the inverter as soon as (i.e. immediately upon) a connection between the switch and the control device is interrupted by the first auxiliary switching element. A fast shutdown mode signal indicates a requirement for shutting down local power generator, in particular an inverter, in case of a specific event or request. Accordingly, by connecting this fast shutdown mode signal line to the switch, in particular an auxiliary switching element of the switch, a shutdown request, in particular a fast shutdown request, can be easily issued depending on a position of the switch. In particular, the fast shutdown request can be easily indicated by interrupting the fast shutdown mode line in the intermediate position of the switch.

In a possible embodiment, the switch may comprise a second auxiliary switching element. The second auxiliary switching element may be configured to interrupt a connection between the control device and a measurement device. The measurement device may be a device, which is connected to the public grid for measuring electrical properties of the public grid and/or power flowing to/from the public grid. In particular, the second auxiliary switching element may interrupt the connection between the control device and the measurement device when the switch is in the intermediate position. Further, the second auxiliary switching element may interrupt the connection when the switch is in the second position. Accordingly, the second auxiliary switching element may connect the control device with the measurement device if the switch is in the first position. Accordingly, the control device is only provided with a measurement signal or measurement data when the switch is in the first position, that is, the public grid is electrically connected with the local grid. In case that the switch is in the intermediate position or the second position, no signal or data from the measurement device is provided to the control device, and thus, the operation of the control device is not influenced by the respective measurement signal or data.

In a possible embodiment, the switch may be a manually operated switch. In particular, the switch may be a mechanical switch, which may be manually operated by a user. For example, the switch may comprise a rotary knob, which is mechanically connected to the switching elements of the switch. However, it is understood, that any other kind of mechanically operated switch may be possible, too. In this way, a very simple and reliable switch may be used for the control arrangement of the inverter.

In a possible embodiment, the control arrangement may comprise an actuator. In particular, the actuator may be configured for mechanically operating the switch. The detailed configuration of the actuator may depend on the respective configuration of the switch. For example, the actuator may comprise a motor, in particular an electrical motor, and, if necessary, a gear for driving an operating element of the switch. In this way, the operation of the mechanically operated switch can be easily automated by controlling the actuator of the switch.

In a possible embodiment, the actuator may be configured to remain for the predefined waiting time, for example, at least five seconds, in the intermediate position before setting the switch to the first position or the second position. In this predefined waiting time, for example, five seconds, the configuration of the inverter may be reinitialized. In any case, the system may be configured and prepared for restart after the fast shutdown mode during this period of time.

In a possible embodiment, the control device may be configured to verify the first predetermined requirements before operating the inverter in the on-grid mode. For example, one of the first predetermined requirement is to a verification of the public grid. The verification of the public grid may comprise, for example, analyzing voltage and/or frequency properties of the public grid. Only if the current properties of the public grid are in line with the predetermined constraints, the local system, in particular, the inverter, may start in an on-grid mode. Otherwise, it may be assumed that the public grid is shut down or a failure exists in the public grid. In this case, it may be not allowed to connect the local grid with the public grid in order to avoid power flowing from the local grid to the public grid.

In a possible embodiment, the control device may be configured to synchronize the inverter with the public grid as soon as (i.e. immediately upon) the switch is set to the first position. In particular, the control device may synchronize a frequency of the inverter with a frequency of the public grid. Furthermore, the control device may also adapt the output voltages of the inverter according to the voltage of the public grid. Accordingly, as soon as the operating properties of the inverter are in line with the related properties of the public grid, the public grid and the local grid may be electrically coupled with each other.

In a possible embodiment of the backup system, the inverter may be configured to be connected with a direct power current source. The direct current power source may comprise, for example, a battery, a photovoltaic power source, a fuel cell or any other appropriate power source.

In a possible embodiment of the method for controlling the inverter, the switch may remain for the predefined waiting time, for example, at least five seconds, in the intermediate position before changing to the first position or the second position. As already mentioned above, the system may be initialized and/or reconfigured in order to restart the inverter in the desired operating mode.

With the present invention it is therefore possible to provide a secure, reliable and simple arrangement for controlling a connection between a local power generator such as a photovoltaic system and/or a battery powered backup system with a public grid. In particular, the connection/disconnection between the public grid and the local grid is controlled by a manually operated mechanical switch. This switch further provides an intermediate position, which is always set when changing between the on-grid mode and the off-grid mode. In this intermediate position, the local power generator, for example the inverter, is immediately shut down in a fast shutdown mode. Accordingly, power generation by the local system can be stopped within a very short period of time. In this way, a secure operation can be provided and constrains and regulations can be fulfilled.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
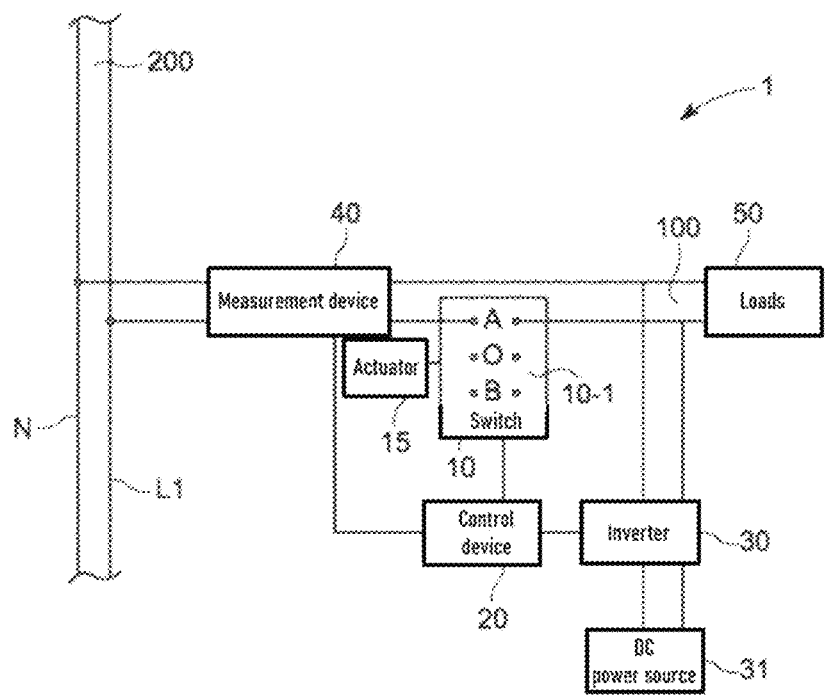
FIG. 1: a schematic diagram of an electrical power backup system with a control arrangement according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a schematic illustration of a circuit diagram of an electrical power backup system according to an embodiment. For a better understanding of the present invention, the example in FIG. 1 only shows a single power line L1. However, as will be described in more detail below, the present invention is also applicable to more than one phase L1. In particular, the present invention may be also applicable, for example, to a three phase system with three power lines L1, L2 and L3.

The backup system 1 may comprise a local power generator, for example, an inverter 30. The inverter 30 may receive input power from a direct current power source 31 and convert the direct current (DC) to an alternating current (AC) with a predetermined frequency and a predetermined voltage (amplitude). The DC power source 31 may be any kind of appropriate DC power source. For example, the DC power source 31 may comprise one or more photovoltaic modules. Furthermore, the DC power source 31 may comprise a battery for temporarily storing energy. Furthermore, any other kind of appropriate DC power source may be possible, too. For example, the DC power source 31 may comprise a fuel cell, a wind turbine or the like.

Inverter 30 may convert the energy provided by one or more of the DC power sources 31 to an appropriate AC voltage and outputs the generated AC voltage to the local grid 100. However, it may be also possible that the inverter 30 may receive AC power and converts the received AC power to DC power for charging a battery of the DC power sources 31. Furthermore, the inverter 30 may also receive DC power from a DC power source 31, for example, a photovoltaic module and use this DC power for charging a battery of the DC power source 31.

As can be further seen in FIG. 1, the local grid 100 of the backup system 1 may be coupled with a public grid 200. For this purpose, at least one phase L1 of the public grid 200 may be electrically coupled with the local grid 100. Furthermore, a neutral line N of the local grid 100 may be also electrically coupled with a corresponding line of the public grid 200.

The backup system 1 may further comprise a measurement device 40 for measuring an amount of electrical energy flowing from the public grid 200 into the local grid 100 or from the local grid 100 into the public grid 200. Furthermore, the measurement device 40 may also measure any other properties such as a voltage of the power line L1, a frequency of the voltage or the like.

As can be further seen in FIG. 1, one or more electrical loads 50 may be connected to the local grid 100. The loads 50 may be provided with electrical power from the local grid 100.

The backup system 1 further comprises a switch 10 for electrically connecting the public grid 200 with the local grid 100. For this purpose, switch 10 may comprise one or more switching elements 10-*i*. In particular, a separate switching element 10-*i* may be provided for each phase L1 (L2, L3) of the local grid 100, which is connected to the public grid 200. Depending on the national or regional regulations, a further switch element may be provided for connected/disconnecting the neutral line N.

Switch 10 may provide at least three switching positions. In a first position A, a respective line of the public grid 200 is electrically connected with the corresponding line of the local grid 100. Accordingly, electrical power may flow from the public grid 200 into the local grid 100. Alternatively, electrical power may flow from the local grid 100, in particular from inverter 30 into the public grid 200.

In a second position B, the local grid 100 is disconnected from the public grid 200. Accordingly, the loads 50 in the local grid 100 are only powered by power provided by the inverter 30.

Further to the first position A and the second position B, switch 10 provides an additional intermediate position 0. In particular, each time when changing from the first position A to the second position B or in the other direction from the second position B to the first position A the respective transition is performed by first switching to the intermediate position 0 and then successively switching to the desired first or second position. In other words, switch 10 is configured such that it is not possible to directly switch from the first position A to the second position B or from the second position B to the first position A without switching to the intermediate position 0.

Switch 10 may be any kind of appropriate mechanical switch providing at least the required number of switching elements 10-*i*. In particular, switch 10 may be a mechanical switch, which is manually operated by a user. For example, switch 10 may comprise a rotary knob with an appropriate number of electrical contacts which are mechanically coupled to the knob. Accordingly, by turning the knob it is possible to switch from the first position A via the intermediate position 0 to the second position B, and back from the second position B via the intermediate position 0 to the first position A. However, it is understood, that any other manner for realizing a mechanical switch, in particular a manually operated mechanical switch, may be possible, too.

Backup system 1 may further comprise a control device 20 for controlling operations of the backup system 1, in particular for controlling operation of inverter 30. In an embodiment, the control device 20 is integrated with the inverter 30. In another embodiment, the control device 20 is external to the inverter 30. For this purpose, control device 20 may receive measurement signals or measurement data from measurement device 40. Further, control device 20 may receive a signal indicating the position of switch 10. Accordingly, the operation of inverter 30 may be controlled by control device 20 based on the current position of the switch 10. For example, inverter 30 may be operated in an on-grid mode if the switching elements 10-*i* of switch 10 are in the first position A for electrically coupling the public grid 200 with the local grid 100. Alternatively, inverter 30 may be operated in an off-grid mode if the switching elements 10-*i* of the switch 10 are in the second position B for disconnecting the local grid 100 from the public grid 200. In the on-grid mode, the output of inverter 30 to the local grid 100 is synchronized with the electrical properties such as frequency and voltage of the public grid 200. In the off-grid mode, inverter 30 is already independent of the public grid 200. Accordingly, inverter 30 may provide output power having a specific predetermined voltage and frequency. In an embodiment, the measurement device 40 is integrated with the switch 10.

When changing between the on-grid mode and the off-grid mode, a plurality of predetermined requirements have to be considered in order to provide a secure transition between the on-grid mode and the off-grid mode. For this purpose, inverter 30 is shut down and restarted during each transition between the on-grid mode and the off-grid mode. In particular, a fast shutdown mode of the inverter 30 is performed when switching switch 10 to the intermediate position 0.

In the following, a transition from the on-grid mode to the off-grid is described. When the backup system 1 is operating in the on-grid mode, the switching elements 10-*i* of switch 10 are in the first position A. Accordingly, the power lines of the public grid 200 are electrically connected with the corresponding lines of the local grid 100. In this on-grid mode, inverter 30 is operated in synchronization with the electrical properties of the public grid 200. In this on-grid mode, electrical power may flow from the public grid 200 into the local grid 100. Alternatively, it may be also possible that electrical power from inverter 30 may flow via the local grid 100 into the public grid 200.

In order to change from the on-grid mode to the off-grid mode, switch 10 may be operated, and consequently, in a first stage, switch 10 is set to the intermediate position 0. Upon detecting this intermediate position 0, for example by control device 20, inverter 30 is shut down. In particular, a fast shutdown mode is initiated in order to immediately stop operation of inverter 30. Accordingly, inverter 30 is stopped within very short period of time, for example, within less than 100 milliseconds. In another example, the inverter 30 is stopped within 50 milliseconds. In another example, the inverter 30 is stopped within a range of 10 milliseconds and 20 milliseconds.

Accordingly, no further electrical power is provided by inverter 30 when switch 10 is in the intermediate position 0. Further to this, the local grid 100 is also disconnected from the public grid in the intermediate position 0 of switch 10. Accordingly, no further electrical power is provided to the loads 50 of the local grid 100.

In the fast shutdown mode of the inverter, the inverter is shut down within a first predefined time period based on one or more first predetermined requirements. The first predetermined requirements are, for example, an emergency alarm such as a fire alarm, a weather alert, etc. The first predetermined requirements are concerned to a safety of the system 1.

In the normal shutdown mode of the inverter, the inverter is shut down within a second predefined time period based on a second predefined conditions. In an example, the second predefined condition is a grid failure.

In an embodiment, the second predefined time period is greater than the first predefined time period. For example, the second predefined time period is greater than the first predefined time period by a predefined value defined by a user using a user interface of the inverter 30. The user interface of the inverter 30 comprises, for example, buttons, graphical user interface, a virtual reality simulation, an augmented reality simulation, or any combination thereof.

In an example, the second predefined time period is greater than the first predefined time period as the inverter continues to feed-in energy to the public grid 200 even after a grid failure is detected. Here, detection of grid failure is one of the second predetermined requirements.

In an embodiment, the switch 10 may remain in the intermediate position 0 for at least a predefined waiting time, for example, at least for five seconds.

Subsequently, switch 10 may be further operated to the second position B. In this second position B, inverter 30 may be restarted in order to operate inverter 30 in the off-grid mode. Before restarting inverter 30 in the off-grid mode, the second predetermined requirements are verified by the control device 20. In an example, only if all the second predetermined requirements are fulfilled, control device 20 may restart inverter 30 in the off-grid mode.

For example, it may be verified whether the local grid 100 is disconnected from the public grid 200. In this way, it can be ensured that no power from the local grid 100 may flow into the public grid 200 in the off-grid mode. However, it is understood, that any other further requirement may be also verified before restarting the inverter 30 in the off-grid mode after setting switch 10 to the second position B.

In the following, a transition from the off-grid mode to the on-grid mode is described.

When operating inverter 30 in the off-grid mode, inverter 30 provides an output power having a predetermined voltage and frequency. In order to change the operation from the off-grid mode to the on-grid mode, switch 10 may be operated to change from the second position B to the intermediate position 0, and then to the first position A. As already mentioned above, the fast shutdown mode of inverter 30 is initiated upon detecting that a switch 10 is in the intermediate position 0. Accordingly, inverter 30 stops further providing output power to the local grid 100. The switch 10 shall remain for the predefined waiting period, for example, at least five seconds, in the intermediate position 0.

In an embodiment, the control device 20 initiates the normal shutdown mode in case of a fast shutdown mode failure is detected by the control device 20. During this predefined waiting period, for example, the inverter 30 may disconnect and may operate according to standard regulation requirements.

After the predefined waiting period, the switch 10 may be further operated and set to the first position A for restarting the backup system 1 in the on-grid mode. In this first position A, the power lines L1 (L2, L3) of the public grid 200 are electrically connected with the local grid 100.

Before restarting inverter 30, a plurality of predetermined requirements have to be verified. Only if the predetermined requirements are fulfilled, inverter 30 may be restarted in the on-grid mode. For example, the predetermined requirements are whether the electrical voltage and the frequency of the public grid are within a predetermined range. However, it is understood, that any other requirement may be also analyzed and checked before restarting inverter 30 in the on-grid mode. In particular, inverter 30 is operated in the on-grid mode in synchronization with the voltage and the frequency of the public grid 200.

As already mentioned above, the switch 10 may be operated manually by a user. However, it may be also possible to operate switch 10 by means of an actuator 15. For example, actuator 15 may comprise an electrical motor. Furthermore, the motor may be mechanically coupled with the switch 10 by a gear or the like. However, it is understood, that any other kind of actuator 15 for operating switch 10 may be possible, too.

In an embodiment, the switch 10 may be operated as an automatic switch. In another embodiment, in case of a system 1 with a plurality of inverters, the switch 10 comprises additional positions to suitable select one or more inverters for generating a total energy from the multiple inverters to supply power to the local grid 100.

Figure 2:
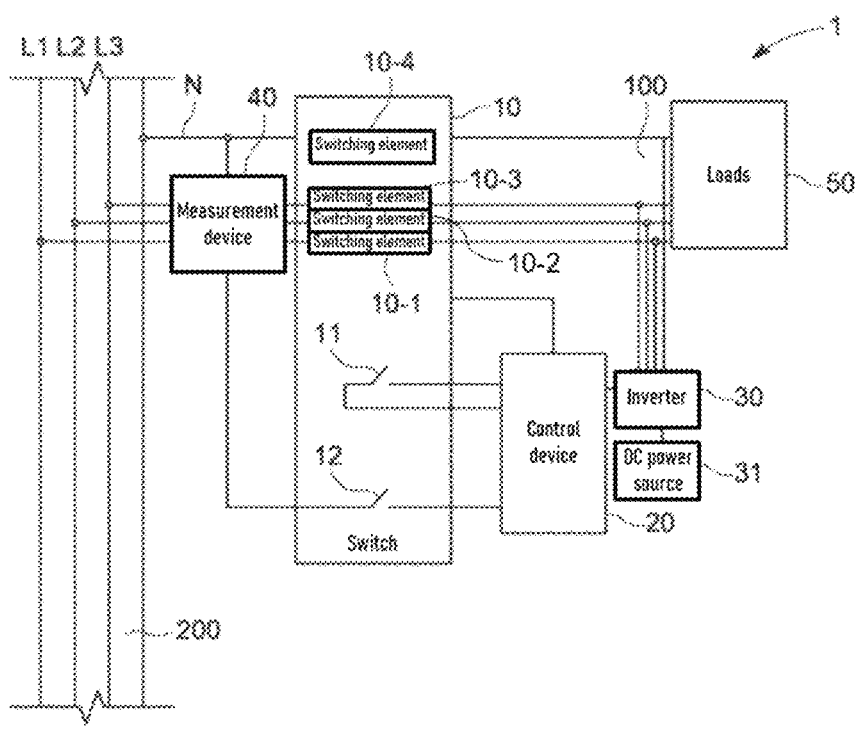
FIG. 2: a schematic diagram of an electrical power backup system with a control arrangement according to another embodiment.

FIG. 2 shows a schematic illustration of a circuit diagram of a backup system 1 according to another embodiment. The embodiment according to FIG. 2 and the following embodiments are mainly based on the previously described embodiment. Thus, the explanation of each embodiment also may apply to the other embodiments as far as possible.

The embodiment according to FIG. 2 differs from the previously described embodiment in that the embodiment according to FIG. 2 relates to a three-phase power system. Accordingly, the local grid 10 comprises three power lines L1, L2 and L3, which are connected to corresponding power lines of the public grid 200. Accordingly, a separate main switching element 10-$i$ may be provided for each phase in order to connect/disconnect the respective line with the corresponding line of the public grid. Depending on the regional or national regulations, a further main switching element 10-4 may be provided for connecting/disconnecting the neutral line N.

As can be further seen in FIG. 2, switch 10 may comprise one or more auxiliary switching elements 11, 12. These additional switching elements 11, 12 may be mechanically coupled with the main switching elements 10-$i$ and an operating element of switch 10.

For example, a first auxiliary switching element 11 may be provided in a signal line of a fast shutdown mode connection. The signal line transmits a fast shutdown signal from the switch 10 to the control device 20 which may be used for indicating a request to shut down the inverter 30 in the fast shutdown mode. Accordingly, the first auxiliary switching element 11 may be configured such that the first auxiliary switching element 11 is in a closed position when the switch 10 is in either the first position A or the second position B, and the first auxiliary switching element 11 is in an open position when the switch 10 is in the intermediate position 0. Accordingly, the fast shutdown signal is interrupted as soon as the switch 10 is set to the intermediate position 0, and consequently, the interruption of the fast shutdown signal causes the shutdown of inverter 30 in the fast shutdown mode.

Further, a second auxiliary switching element 12 may be provided in a connection between the measurement device 40 and the control device 20. The second auxiliary switching element 12 may be in a closed position when the switch 10 is in the first position A, and the system 1 is operating in the on-grid mode. Accordingly, the measurement signals or data from measurement device 20 are provided to the control device 20 when the second auxiliary switching element 12 is in the closed position and the switch 10 is in the first position A.

Further, the connection between the measurement device 40 and the control device 20 may be interrupted when the switch 10 is in the intermediate position 0 or in the second position B. Accordingly, the control device 20 does not receive any measurement signals or data from the measurement device 40 when the switch 10 is in the intermediate position 0 or the second position B. Accordingly, the operation for controlling inverter 30 is not influenced by the measurement signals or measurement data from measurement device 40 when switch 10 is in the intermediate position 0 or the second position B for the off-grid mode. The measurement data from the measurement device 40 to the control device 20 may be provided, for example, by a communication link such as a MOD-bus connection. However, if further data have to be provided to control device 40 via such a MOD-bus connection, an additional MOD-bus connection may be used, which is not interrupted in the intermediate position 0 or the second position B of switch 10.

In an embodiment, the first auxiliary switching element and second auxiliary switching element 12 are integrated to the switch 10. In another embodiment, the first auxiliary switching element 11 and second auxiliary switching element 12 are external to the switch 10.

Figure 3:
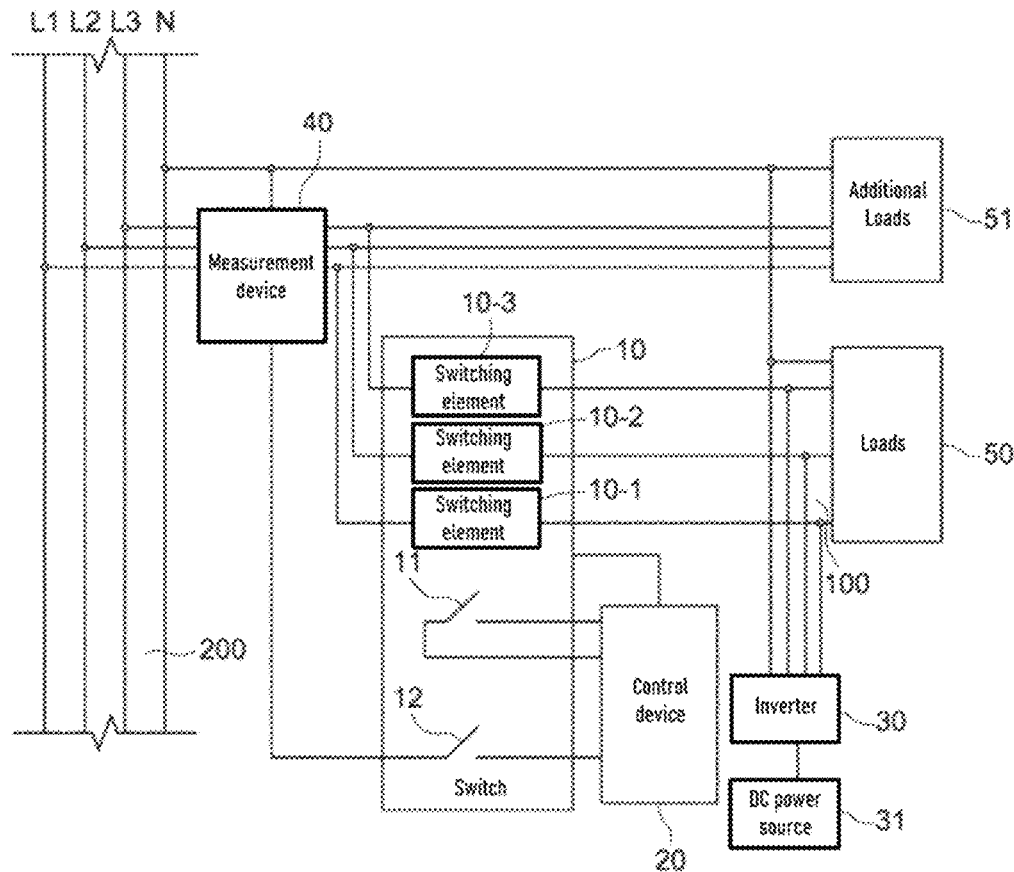
FIG. 3: a schematic diagram of an electrical power backup system with a control arrangement according to still a further embodiment.

FIG. 3 shows a further example of a backup system 1 according to an embodiment. The example according to FIG. 3 mainly differs from the previous described embodiment in that system 1 according to FIG. 3 comprises one or more first loads 50, electrically connected to the local grid 100, which may be provided with power in the off-grid mode. Further additional loads 51 may be directly connected to the public grid 200. Accordingly, only the first loads 50 of the local grid 100 are provided with power from inverter 30 in the off-grid mode. The additional loads 51 may be disconnected from the local grid 100 when switch 10 is in the second position B.

Further to this, the embodiment according to FIG. 3 shows a configuration wherein the neutral line N is not interrupted by the switch 10. As already mentioned above, the requirement whether or not a neutral line N has to be interrupted by the switch 10 depends on regional or national regulation requirements.

Figures 4, 5, 6:
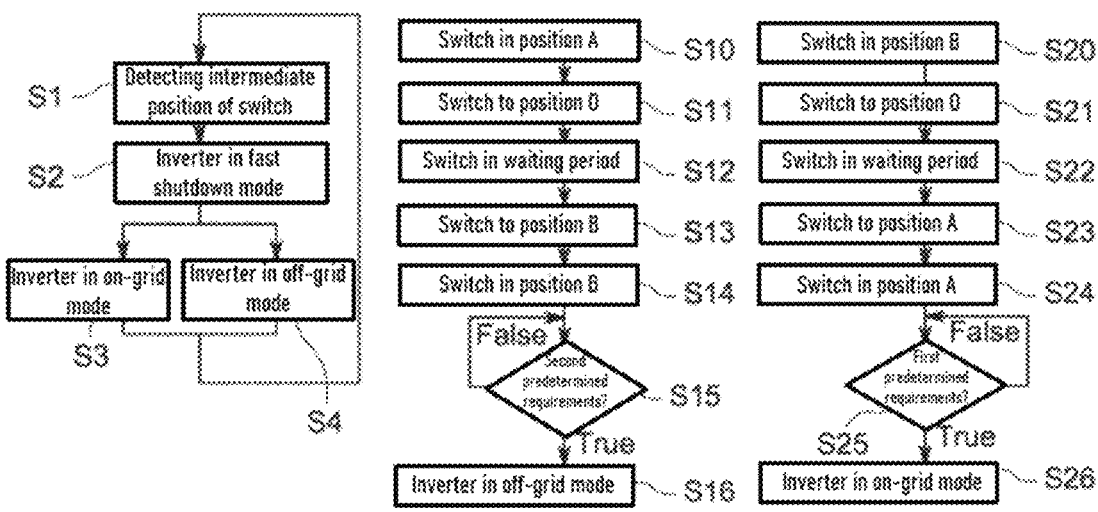
FIG. 4: a flow diagram illustrating a method for controlling an inverter according to an embodiment.
FIG. 5: a flow diagram illustrating a transition from on-grid to off-grid mode.
FIG. 6: a flow diagram illustrating a transition from an off-grid mode to an on-grid mode according to an embodiment.

FIG. 4 shows a flow diagram illustrating a method for controlling an inverter 30 according to an embodiment. The method may comprise any kind of step, which has been already described above in connection with the backup system 1. Furthermore, the above described backup systems may comprise any kind of component for realizing an operation as will be described below in connection with the related methods.

The method may comprise a step S1 of detecting an intermediate position 0 of a switch 10. As already described above, switch 10 may be a switch with at least three switching positions, a first position A, a second position B and an intermediate position 0. Especially, the switch is always set to the intermediate position 0 during each change between the first and the second positions.

In a further step S2, the inverter 30 is immediately shut down in a fast shutdown mode upon detecting that the switch 10 is set to the intermediate position 0. The fast shutdown mode is initiated at step S2.

The inverter 30 may further be operated in step S3 in an on-grid mode when the switch 10 is set to the first position A. Alternatively, the inverter 30 may be operated in step S4 in an off-grid mode when the switch 10 is set to the second position B.

In particular, the switch 10 may remain for the predefined waiting period, for example, at least five seconds, in the intermediate position 0 before changing to the first position A or the second position B.

FIG. 5 shows a flow diagram illustrating a transition from an on-grid mode to the off-grid mode. In step S10, the switch 10 is in the first position A.

In step S11, the switch may change from the first position A to the intermediate position 0. For example, the control device 20 monitors the fast shutdown signal transmitted from the switch 10 upon a transition from the first position A to the intermediate position 0. In other words, the switch 10 transmits a fast shutdown signal to the control device 20 when the switch 10 is moved to the intermediate position 0. The control device 20 detects the position of the switch 10 in the intermediate position 0 based on the fast shutdown signal.

Additionally or alternatively, the switch 10 comprises a first auxiliary switching element 11 which moves from a closed position to an open position upon transition from the first position A to the intermediate position 0, thereby initiating the fast shutdown mode of the inverter 30.

Upon detecting a transition to the intermediate position 0 by the control device 20, the inverter 30 is immediately shut down in a fast shutdown mode. In an embodiment, a connection between a measurement device 40, and a control device 20 may be interrupted upon detecting a transition of the switch 10 from the first position A to the intermediate position 0. In other words, the switch 12 is opened when the switch 10 is moved from the first position A to the intermediate position 0.

In step S12, switch 10 may remain in the intermediate position 0 for a predetermined waiting period, for example, at least five seconds. In an embodiment, the control device 20 initiates the normal shutdown mode in case of a fast shutdown mode failure is detected by the control device 20 during this predefined waiting period, for example, the inverter 30 may disconnect and may operate according to standard regulation requirements. In an embodiment, the switch 10 may not necessarily remain in the intermediate position 0 for a predetermined waiting period. That is, the step S12 is an optional step as shown in FIG. 5.

In step S13, the switch 10 may change from the intermediate position 0 to the second position B. Once the switch 10 changes the position from the intermediate position 0 to the second position B, the switch 10 stops the transmission of the fast shutdown signal to the control device 20. The control device 20 stops receiving the fast shutdown signal from the switch 10. Accordingly, in step S14, the switch 10 may be in the second position B.

The control device 20 detects that the switch 10 is in the second position B. The multiple second predetermined requirements for restarting the inverter 30 in the off-grid mode are verified by the control device 20 in step S15. Only if all the second predetermined requirements are fulfilled, the control device 20 restarts the inverter 30 in the off-grid mode. Otherwise, the inverter 30 may remain shut down until the requirements are fulfilled. In an embodiment, the control device 20 restarts the inverter 30 in the off-grid mode when one or more second predetermined requirements are fulfilled.

The second predetermined requirements are a disconnection between the inverter 30 and the public grid 200 is detected by the control device 20 based on parameters such as voltage on the AC side of the inverter 30, etc., and the control device 20 stops receiving the fast shutdown signal from switch 10.

Finally, once the control device 20 determines that the second predetermined conditions are satisfied, the inverter 30 operates in the off-grid mode in step S16. In the off-grid mode, the inverter 30 supplies energy to the local grid 100 and/or direct current power source 31.

FIG. 6 shows a flow diagram illustrating a transition from the off-grid mode to the on-grid mode according to an embodiment.

In step S20, switch 10 is in the second position B.

In step S21, switch 10 may change from the second position B to the intermediate position 0. The control device 20 detects a change in the position of the switch 10 from the intermediate position 0 to the second position B based on the fast shutdown signal. The control device 20 initiates the fast shutdown mode of inverter 30 once the switch 10 is in the intermediate position 0. The switch 10 transmits the fast shutdown signal to the control device 20 when the switch 10 is moved to the intermediate position 0. The control device 20 detects the position of the switch 10 in the intermediate position 0 based on the fast shutdown signal.

In an embodiment, the switch 10 comprises a first auxiliary switching element 11 which moves from a closed position to an open position upon transition from the second position B to the intermediate position 0, thereby initiating the fast shutdown mode of the inverter 30.

Upon detecting a transition to the intermediate position 0 from the second position B by the control device 20, the inverter 30 is immediately shut down in the fast shutdown mode. In an embodiment, the connection between the measurement device 40, and the control device 20 may be interrupted upon detecting a transition of the switch 10 from the second position B to the intermediate position 0. In other words, the second auxiliary switching element 12 is opened when the switch 10 is moved from the second position B to the intermediate position 0.

In step S22, the switch 10 may remain in the intermediate position 0 for the predefined waiting period, for example, at least five seconds. In an embodiment, the control device 20 initiates the normal shutdown mode in case of a fast shutdown mode failure is detected by the control device 20. During this predefined waiting period, for example, the inverter 30 may disconnect and may operate according to standard regulation requirements.

In step S23, the switch 10 may change from the intermediate position 0 to the first position A. The control device 20 detects a change in the position of the switch 10 from the intermediate position 0 to the first position A. Once the switch 10 changes the position from the intermediate position 0 to the first position A, the switch 10 stops the transmission of the fast shutdown signal to the control device 20. The control device 20 stops receiving the fast shutdown signal from the switch 10. In other words, the first auxiliary switching element 11 is closed when the switch 10 is moved from the intermediate position 0 to the first position A. Further, the second auxiliary switching element 12 is closed when the switch 10 is moved from the intermediate position 0 to the first position A.

Accordingly, the switch 10 in the first position A indicates an on-grid mode of the inverter 30. In particular, the electrical connection between the public grid 200 and the local grid 100 may be established in this first position A. In other words, the on-grid mode allows the public grid 200 and/or the inverter 30 to supply energy to the local grid 100.

But the control device 20 of the inverter 30 continues to keep the inverter 30 shut down until the first predetermined requirements are verifies in step 25 by the control device 20.

In order to operate the inverter 30 in the on-grid mode, it may be verified in step S25, whether all the first predetermined requirements are fulfilled by the control device 20. In an embodiment, the control device 20 verifies one or more first predetermined requirements for the inverter 30 to start operating in the on-grid mode.

In an embodiment, only if all the first predetermined requirements are fulfilled, the control device 20 of the inverter 30 starts the inverter 30 in the on-grid mode. In the on-grid mode of the inverter 30, the electrical connection between the public grid 200 and the local grid 100 may be established in this first position A. Otherwise, the inverter 30 may remain shut down until all the first predetermined requirements are fulfilled.

The first predetermined requirements are the control device 20 of the inverter 30 detects that the public grid 200 is ON based on regulations; the measurement device 40 detects that the public grid 200 is ON based on regulations; the control device 20 stops receiving the fast shutdown signal from the switch 10; and an output of the monitoring circuit which configured to monitor a state of the switch (10).

In step S26, the inverter 30 may operate in the on-grid mode in synchronization with the electrical parameters of the public grid 200.

Summarizing, the present invention provides a secure, reliable and simplified control mechanism for operating an inverter in a local grid, which may be connected with a public grid. In particular, a mechanical switch is provided for connecting the local grid with the public grid and for disconnecting the local grid from the public grid. The mechanical switch comprises an intermediate position. Each time when the switch is in this intermediate position, the inverter is immediately shut down in a fast shutdown operation.

The invention claimed is:

1. A control arrangement for an inverter, comprising:
   a switch with at least three switching positions comprising a first position, a second position and an intermediate position; and
   a control device for controlling an operation of the inverter,
   wherein the switch is set to the intermediate position during each change between the first position and the second position, and
   wherein the control device is configured to shut down the inverter as soon as the switch is set to the intermediate position, operate the inverter in an on-grid mode when the switch is set to the first position, and operate the inverter in an off-grid mode when the switch is set to the second position,
   wherein the switch comprises a first auxiliary switching element which is configured to interrupt a connection between the switch and the control device when the switch is in the intermediate position, and to close the connection between the switch and the control device when the switch is in the first position or the second position, and
   wherein the control device is configured to immediately shut down the inverter as soon as the connection is interrupted.

2. The control arrangement according to claim 1, wherein the switch comprises a second auxiliary switching element which is configured to interrupt a connection between the control device and a measurement device connected to a public grid when the switch is in the second position, and to connect the control device with the measurement device if the switch is in the first position.

3. The control arrangement according to claim 1, wherein the control device is configured to shut down the inverter within a time interval of maximum 50 milliseconds as soon as the switch is set to the intermediate position.

4. The control arrangement according to claim 1, wherein the switch is configured to connect a public grid and a local grid in the first position and to disconnect the public grid from the local grid in the second position.

5. The control arrangement according to claim 4, wherein the control device comprises a monitoring circuit configured to monitor a state of the switch, and wherein the control device only operates the inverter in the off-grid mode if the local grid is disconnected from the public grid.

6. The control arrangement according to claim 1, wherein the switch is a manually operated switch.

7. The control arrangement according to claim 6, comprising an actuator which is mechanically coupled to the switch and configured to mechanical operate the switch.

8. The control arrangement according to claim 7, wherein the actuator is configured to remain for a predefined waiting period in the intermediate position before setting the switch to the first position or the second position.

9. The control arrangement according to claim 1, wherein the control device is configured to verify whether the public grid is in a normal condition before operating the inverter in the on-grid mode.

10. An electrical power backup system, comprising:
- an inverter configured to provide an alternating current power supply; and
- a control arrangement for the inverter according to claim 1,
- wherein the switch is configured to connect a public grid and a local grid if the switch is in the first position and to disconnect the public grid from the local grid if the switch is in the second position and the intermediate position.

11. The electrical power backup system according to claim 10, wherein the inverter is configured to be connected to a direct current power source, and the direct power source comprises at least one of a battery or a photovoltaic power source.

12. A method for controlling an inverter, comprising:
- detecting an intermediate position of a switch with three switching positions including a first position, a second position and an intermediate position;
- shutting down the inverter upon detecting that the switch is set to the intermediate position;
- operating the inverter in an on-grid mode when the switch is set to the first position; and
- operating the inverter in an off-grid mode when the switch is set to the second position,
- wherein the switch comprises a first auxiliary switching element which interrupts a connection between the switch and the control device when the switch is in the intermediate position, and closes the connection between the switch and the control device when the switch is in the first position or the second position, and wherein the control device immediately shuts down the inverter as soon as the connection is interrupted.

13. The method according to claim 12, wherein the switch remains for a predefined waiting period in the intermediate position before changing to the first position or to the second position.

* * * * *